United States Patent [19]
Johnston

[11] Patent Number: 4,815,749
[45] Date of Patent: Mar. 28, 1989

[54] SHAFT AND LIKE OIL SEALS

[75] Inventor: David E. Johnston, Newcastle-upon-Tyne, United Kingdom

[73] Assignee: George Angus & Company Limited, Newcastle-upon-Tyne, United Kingdom

[21] Appl. No.: 52,859
[22] PCT Filed: Aug. 18, 1986
[86] PCT No.: PCT/GB86/00490
§ 371 Date: Apr. 20, 1987
§ 102(e) Date: Apr. 20, 1987
[87] PCT Pub. No.: WO87/01169
PCT Pub. Date: Feb. 26, 1987

[30] Foreign Application Priority Data
Aug. 20, 1985 [GB] United Kingdom ............... 8520859

[51] Int. Cl.$^4$ ............................................. F16J 15/32
[52] U.S. Cl. ................................... 277/134; 277/153
[58] Field of Search ................... 277/134, 152, 153

[56] References Cited
U.S. PATENT DOCUMENTS 4,183,543 1/1980 Antonini ............................. 277/134
4,350,347 9/1982 Heinrich ......................... 277/134 X
4,441,722 4/1984 Pichter ................................. 277/134
4,671,519 6/1987 Bras et al. ........................... 277/134

FOREIGN PATENT DOCUMENTS 033963 8/1981 European Pat. Off. .
081637 1/1983 European Pat. Off. .
2040009 8/1980 United Kingdom .

Primary Examiner—Donald Watkins
Attorney, Agent, or Firm—William R. Hinds

[57] ABSTRACT

A shaft seal having a lip of an elastomeric sealing ring formed with a frusto-conical band around the shaft and has an annular non-constant clearance around the shaft and wherein upon shaft rotation liquid pulsation in said clearance causes oscillation of the band which in turn causes displacement pumping towards the oil side of the shaft.

6 Claims, 3 Drawing Sheets

SHAFT AND LIKE OIL SEALS

This invention relates to shaft and like oil seals, for preventing liquid leakage between relatively rotatable members, such as a rotary shaft and its housing.

Usually the liquid to be sealed is lubricating oil, the seals therefore commonly being called "oil seals", the side of a seal to be installed facing towards the region to be sealed being called the "oil side" and the other side being called the "air side" because it is usually open to atmospheric pressure.

Shaft seals are usually mounted fluid tight fast in a shaft housing and have an inner peripheral lip to seal around a cylindrical surface of a rotary shaft. Such seals are known as "internal seals". Occasionally however shaft seals are designed to be mounted fluid tight on a rotary shaft to seal by an outer peripheral lip against a surrounding cylindrical surface of a housing and are then called "external seals". In general, the design and operating conditions of internal seals can, by simple inversion, be applied to external seals. Consequently, references in this specification to internal seals are to be treated as applicable to external seals, unless otherwise stated.

Usually the sealing lip or ring of a shaft seal is made of a resiliently deformable material, such as an oil-resistant synthetic rubber or elastomer.

During the last twenty years, "positive action" seals have been developed and these have helical ribs, or similar configurations, at the air side of the sealing or contact band of a sealing lip or ring for the purpose of returning leakage oil towards the oil side.

There have been proposals to provide ribs or other configurations at the oil side of a sealing or contact band of a sealing lip or ring but, so far as is known, these have not come into use and whether any positive action is achieved thereby has not been established.

The present invention provides a positive action oil seal which utilises relative rotation of sealed members to generate at a sealing contact band a pumping action to displace oil towards the oil side.

According to the invention, there is provided an oil seal to oppose leakage of oil from between relatively rotatable coaxial members, one of the relatively rotatable members having a sealed circular counter-surface of given diameter; the oil seal having an oil side and an air side and comprising: an elastomeric sealing member; a circular sealing contact band formed on said elastomeric sealing member and arranged to bear against the circular countersurface; said contact band being designed to diverge from the counter-surface, to define with the counter-surface an annular sealing region which enlarges in cross-sectional area toward the oil side of the seal; and a skirt provided at the oil side of said elastomeric sealing member, said skirt being constructed and arranged to have a continuous but non-constant annular clearance from said counter-surface and so as to be oscillatable by pulsations in the adjacent oil; the construction and arrangement being such that relative rotation between the counter-surface and said elastomeric sealing member produces pulsations in oil filling the annular clearance, the oil pulsations cause the contact band to osculate against the counter surface over at least part of said annular sealing region and the contact band osculations produce displacement pumping of oil from the annular sealing region toward the oil side of the seal.

The term "contact" is of course used to include nominal or effective contact, with an interposed oil film, to maintain a meniscus between the contact band and its counter-surface, as well understood in oil seal technology.

The osculation of the contact band against its counter-surface may comprise either or both deformation, of the elastomeric material of the sealing member, or oscillation of the contact band eccentrically to the counter-surface, thus varying cyclically the radial dimension of the annular sealing region to produce a pulsating pumping action towards the oil side.

The non-constant clearance of the skirt from the sealed member, usually a sealed shaft surface, can be achieved in a variety of ways, including eccentricity or a lobed configuration of the skirt. It could be achieved by shaping of the shaft or other sealed surface but this is not really practicable having regard to the practice of providing shaft seals to fit any shaft of a given diameter and surface finish.

The invention is illustrated by way of example on the accompanying drawings, in which.

Figure 1:
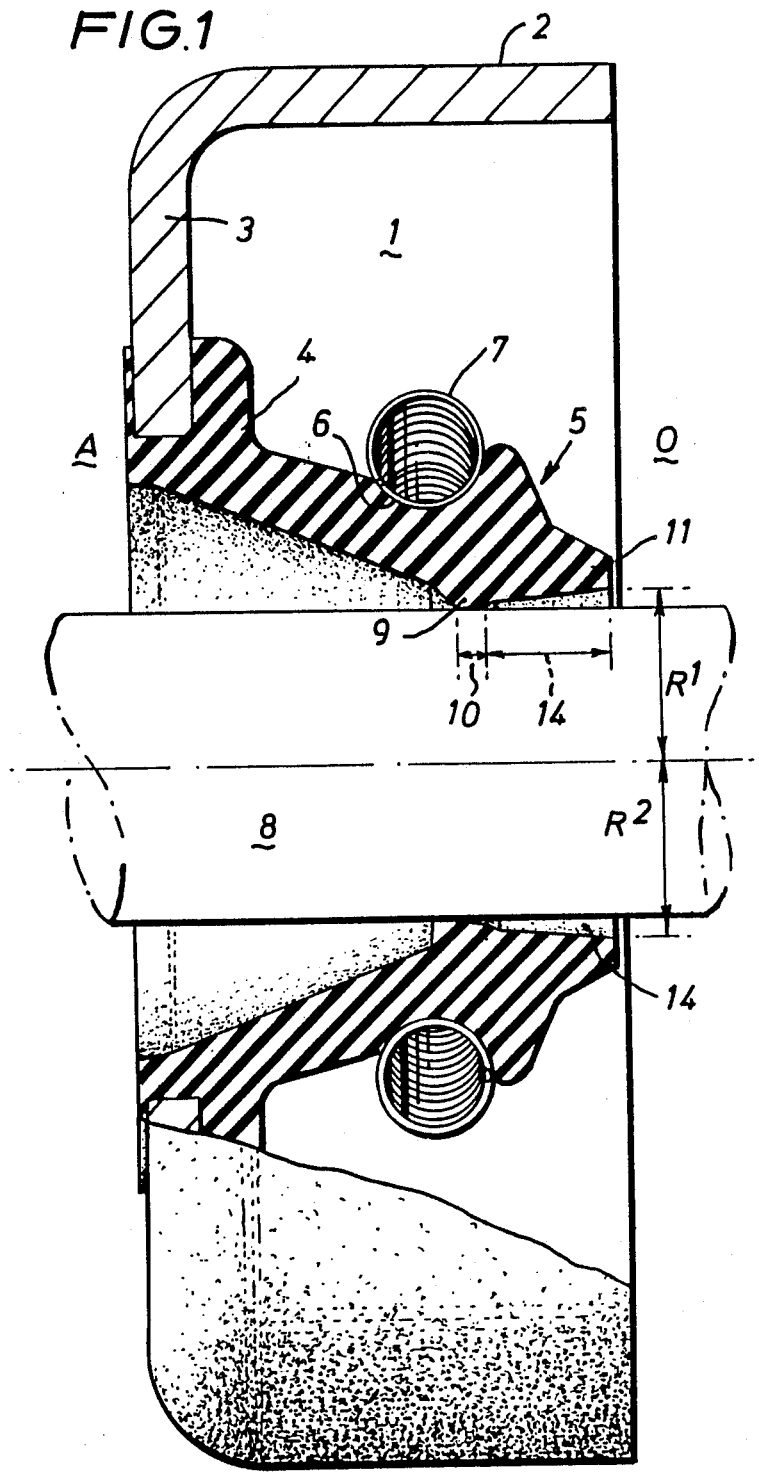
FIG. 1 is a somewhat diagrammatic axial section of an internal lip shaft seal in place on a shaft, the proportions of the seal being exaggerated to illustrate on a relatively large scale the seal and shaft contact zone.

The internal lip shaft seal shown by FIG. 1 is basically of a well-known construction with a metal case 1 of L-section of which the axial flange 2 fits fluid-tight in a surrounding shaft housing (not shown) and the radial flange 3 has bonded to its inner-peripheral rim a synthetic rubber sealing ring 4 moulded on to the case.

The sealing ring 4 has a sealing head 5 with a circumferential groove 6 in which is seated a constricting garter spring 7 which loads the sealing head 5 resiliently to contact the cylindrical surface of a shaft 8 by a lip 9.

As so far described, the seal of FIG. 1 is conventional. The oil side of the seal is indicated as O and the air side as A.

In accordance with the present invention, the lip 9 has its inner periphery formed as a frusto-conical contact band 10 around the shaft 8 (see FIG. 2) and a skirt 11, in the form of a tapered axial flange is provided on the sealing head 5 at the oil side O.

Figure 2:
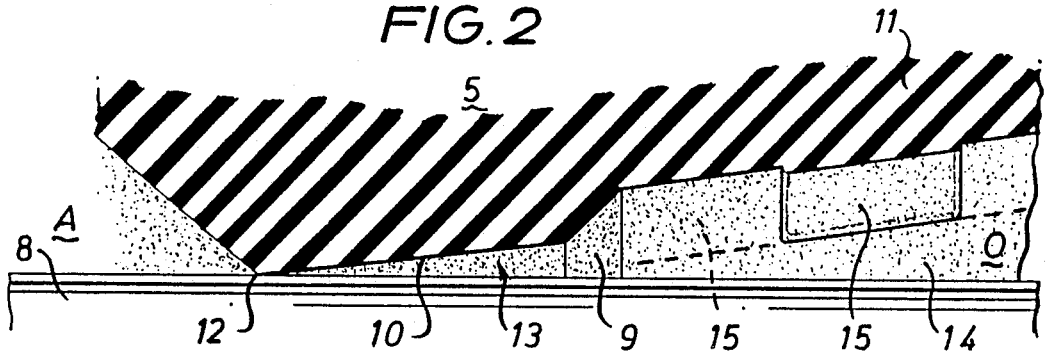
FIGS. 2, 3 and 4 are fragmentary axial sections, on a much enlarged scale, illustrating one mode of displacement pumping action, by resilient deformation of the seal of FIG. 1.

As best shown by FIG. 2, the frusto-conical contact band 10 is designed to make constant close contact, with a shaft of given diameter, by the edge 12 at the air side A of the flange 9 and to diverge from the shaft surface to define a sealing region 13 which enlarges in cross-sectional area towards the oil side O.

Instead of the contact band 10 being moulded frusto-conical, it could be cylindrical and be constricted to frusto-conical shape by the assymetric load of the garter spring 7. A moulded frusto-conical surface is however preferred as being more definite.

The skirt 11 has an annular clearance 14 around the shaft and, in one way or another, this clearance is designed to be non-constant so that, when the shaft 8 rotates, pulsation of oil is produced, in the clearance 14, to oscillate the skirt, thus cause osculation of the contact band 10 against the opposed shaft surface and thereby displacement pumping of oil in the sealing region 13 towards the oil side O.

Figure 3:
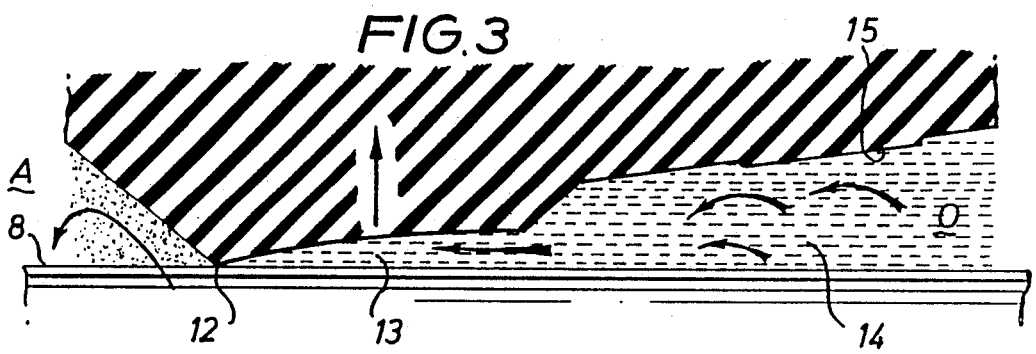
Figure 4:
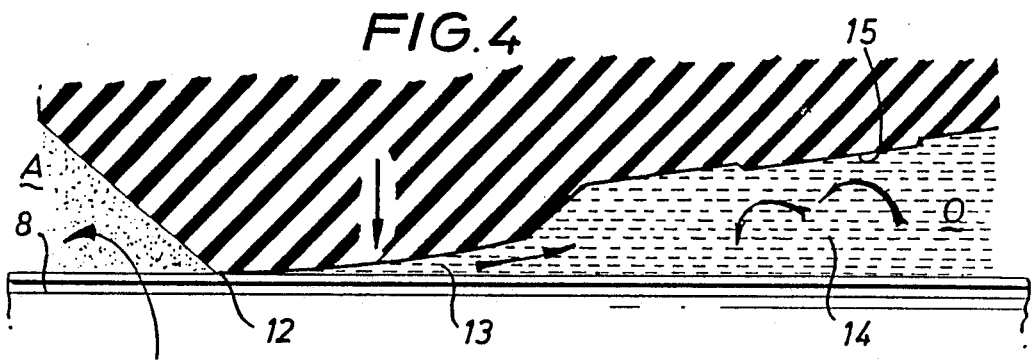

This pumping action is illustrated in a very simple manner by FIGS. 3 and 4 which represent a single cycle of the skirt 11 deflecting to arch the contact band 10 away from the shaft (FIG. 3) and then reversing to cause the contact band to approach and "kiss" the shaft (FIG. 4) and thus displace oil towards the oil side and away from the contact edge 12 which is the boundary for leakage. This cycle takes place at shaft rotational speed or higher.

Figure 5:
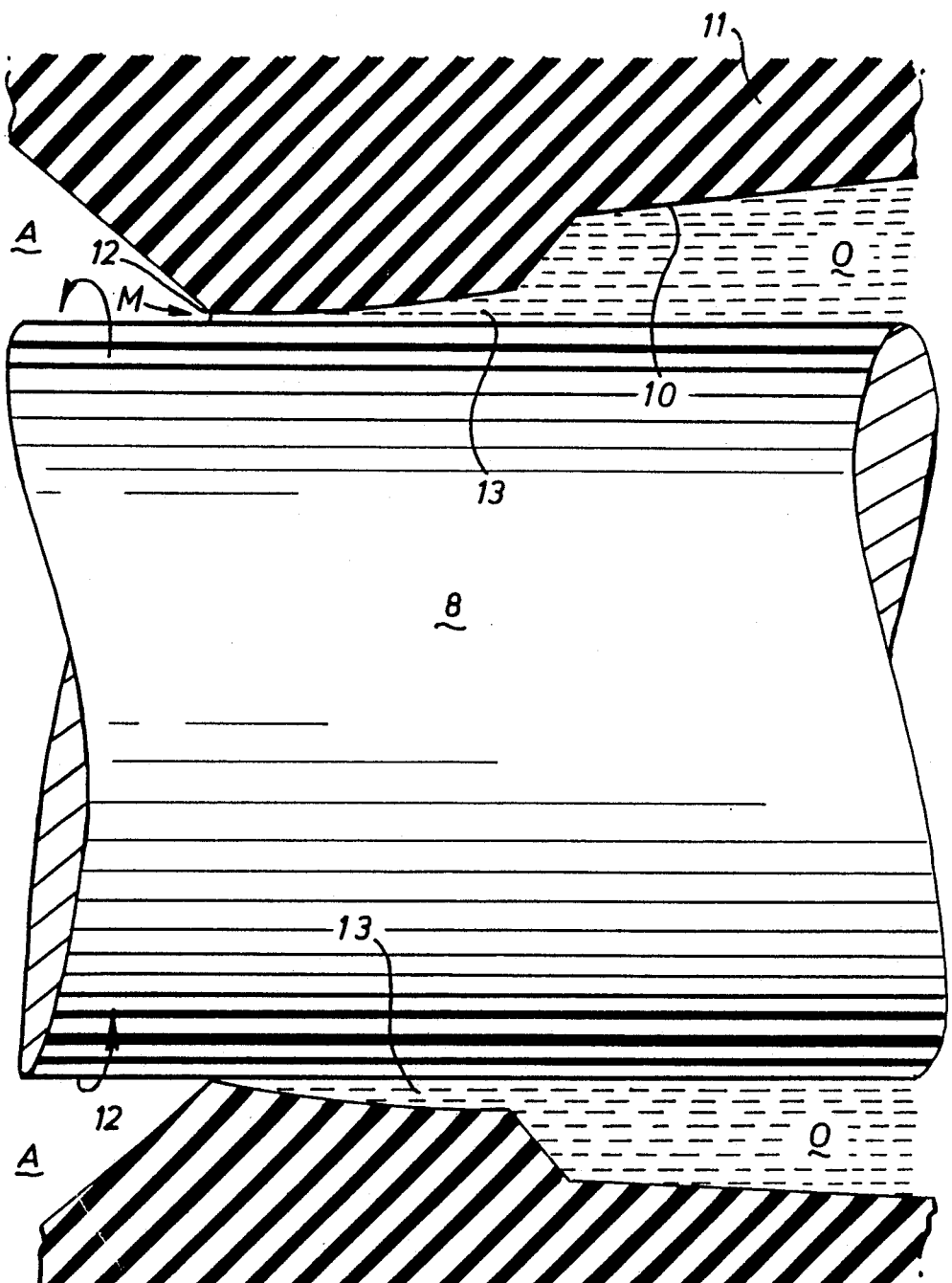
FIG. 5 is a fragmentary axial section, on a very much enlarged scale, to illustrate eccentric oscillation of the contact band to produce another mode of displacement pumping action of the seal of FIG. 1

Another mode of pumping action is illustrated by FIG. 5 which shows the contact band 10 displaced slightly radially, so that it is eccentric to the shaft, with a consequent cyclic variation in the radial dimension of the sealing region due to the pulsating action of the skirt. The radial variation should not be so great as to break down the sealed liquid meniscus M at the edge 12.

It is considered probable that the osculation of the contact band against the shaft surface in practice is a complex combination of at least the two modes of pumping action illustrated. Every shaft has some eccentricity, of shape or rotation however slight, and this is a factor which affects the radial dimension of the sealing region, apart from the effect of the oscillation of the skirt in the present invention.

It will be appreciated that the above description is only a very simplistic explanation of the positive action pumping effect of providing a seal with a contact band diverging from the shaft surface towards the oil side and a skirt with a non-constant clearance around the shaft. The improved sealing performance of such a seal can be demonstrated, such as by a back-to-back test against a conventional seal, but a closer theoretical explanation, of what must be a very complex effect at the seal-shaft interface, cannot at present be offered.

Possible ways of providing for a non-constant clearance 14, between the skirt 11 and the shaft surface, include moulding the skirt slightly eccentric to the seal axis, so that the dimensions $R^1$ and $R^2$ in FIG. 1 are different and the radial dimension of the clearance 14 progressively varies around the shaft.

Another way, illustrated in FIG. 2, is to mould the inner surface of the skirt 11 with an arcuate boss or lobe 15 so that oil entrained with shaft surface rotation has a path of varying radial dimension around the clearance 14 and this will set up oscillation of the skirt. The shape and extent of the lobe 15 as illustrated is only for example. The radial, circumferential and axial dimensions of such lobes may be selected to suit requirements.

The conical angle of the contact band will be selected in accordance with other factors affecting the oil displacement, or hydrodynamic lift, of the contact band. Such factors include the dimensions and material of the sealing ring, the shaft speed and other operating conditions, including the fluid viscosity and other fluid characteristics, for which the seal is designed. Present indications are that a small angle, of 5°-10°, will be effective.

I claim:

1. An oil seal to oppose leakage of oil from between relatively rotatable coaxial members, one of the relatively rotatable members having a sealed circular counter-surface of given diameter; the oil seal having an oil side and an air side and comprising: an elastomeric sealing member; a circular sealing contact band formed on said elastomeric sealing member and arranged to bear against the circular counter-surface; said contact band being designed to diverge from the counter-surface, to define with the counter-surface an annular sealing region which enlarges in cross-sectional area toward the oil side of the seal; and a skirt provided at the oil side of said elastomeric sealing member, said skirt being constructed and arranged to have a continuous but non-constant annular clearance from said counter-surface and so as to be oscillatable by pulsations in the adjacent oil; the construction and arrangement being such that relative rotation between the counter-surface and said elastomeric sealing member produces pulsations in oil filling the annular clearance, the oil pulsations cause the contact band to osculate against the counter surface over at least part of said annular sealing region and the contact band osculations produce displacement pumping of oil from the annular sealing region toward the oil side of the seal.

2. An oil seal as claimed in claim 1 wherein said skirt on the elastomeric sealing member is arranged to be eccentric with respect to the rotational axis of the relatively rotatable members, thereby to provide said non-constant annular clearance from the counter surface.

3. An oil seal as defined in claim 1 wherein said skirt on the elastomeric sealing member is provided with lobes extending toward the counter-surface, thereby to provide said non-constant annular clearance from the counter-surface.

4. An oil seal as claimed in claim 1 wherein said skirt is formed as a tapered axial flange axially adjacent said contact band, and the skirt is so contructed and arranged that at least part of its annular clearance from the countersurface is greater than the annular clearance of the divergent contact band.

5. An oil seal as claimed in claim 4 wherein all of the annular clearance of said skirt is greater than the maximum annular clearance of said contact band.

6. An oil seal as claimed in claim 1 wherein said contact band is of generally frusto-conical section with a conical angle of about 5°-10°.

* * * * *